United States Patent

Sullivan

(10) Patent No.: US 8,214,970 B2
(45) Date of Patent: Jul. 10, 2012

(54) WHEEL SYSTEM WITH LIFTER APPARATUS

(75) Inventor: Terrance Patrick Sullivan, Madison, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/638,734

(22) Filed: Dec. 15, 2009

(65) Prior Publication Data

US 2011/0140377 A1 Jun. 16, 2011

(51) Int. Cl.
*B60B 9/00* (2006.01)

(52) U.S. Cl. ...................................................... 16/18 B

(58) Field of Classification Search ................... 16/18 B, 16/18 R; 280/5.2, 5.32
See application file for complete search history.

(56) References Cited

U.S. PATENT DOCUMENTS

| 1,105,379 | A | * | 7/1914 | Schulze | 280/5.22 |
| 3,239,872 | A | * | 3/1966 | Kitrell | 16/18 R |
| 4,467,496 | A | * | 8/1984 | Gregg | 16/18 B |
| 5,983,452 | A | * | 11/1999 | McGovern | 16/42 R |
| 7,036,185 | B2 | * | 5/2006 | Morndal et al. | 16/18 B |

FOREIGN PATENT DOCUMENTS

| GB | 2145983 | A | * | 4/1985 |
| JP | 05178001 | A | * | 7/1993 |
| WO | 2010027255 | | | 3/2010 |

* cited by examiner

*Primary Examiner* — Victor Batson
*Assistant Examiner* — Matthew Sullivan
(74) *Attorney, Agent, or Firm* — Andrus, Sceales, Starke & Sawall, LLP

(57) ABSTRACT

A wheel system includes a frame, a wheel rotatably mounted to the frame, and a lifter. The lifter defines a first end and a second end. The first end of the lifter is pivotably mounted to the frame, and the second end of the lifter defines a contact surface. The contact surface of the lifter is adapted to establish initial contact with a vertically disposed obstacle, and thereafter the lifter is configured to pivot about the first end such that the wheel is lifted and translated over the vertical obstacle.

11 Claims, 5 Drawing Sheets

WHEEL SYSTEM WITH LIFTER APPARATUS

BACKGROUND OF THE INVENTION

The subject matter disclosed herein relates to a wheel system with a lifter apparatus.

Wheel systems such as, for example, a caster wheel system may be mounted on an object or device to facilitate movement. Caster wheel systems can have a fixed alignment to roll in a single direction, or they can be mounted on a pivot such that the wheel automatically swivels thereby aligning itself to the direction of motion. Examples of objects commonly implementing wheel systems to facilitate movement include medical devices, wheel chairs, hand trucks, and utility carts. A non-limiting example of medical devices incorporating such wheel systems includes anesthesia machines, portable scanners or imaging devices, patient monitoring devices, hospital beds, etc.

One problem with conventional wheel systems is that they are not well suited to travel over vertical obstacles such as a threshold or a step. This problem is highlighted when the wheel system is being implemented to facilitate the movement of a medical device within a hospital environment. It is not uncommon to implement wheel systems to roll heavy medical devices (600+ lbs) over thresholds or other generally vertically disposed obstacles within the hospital. As an example, International Electrotechnical Commission (IEC) 60601-1 2005 Clause 9.4.2.4.3 requires medical equipment to move over a 20 mm tall obstacle (threshold) at a speed of 0.4 meters/second.

BRIEF DESCRIPTION OF THE INVENTION

The above-mentioned shortcomings, disadvantages and problems are addressed herein which will be understood by reading and understanding the following specification.

In an embodiment, a wheel system includes a frame, a wheel rotatably mounted to the frame, and a lifter. The lifter defines a first end and a second end. The first end of the lifter is pivotably mounted to the frame, and the second end of the lifter defines a contact surface. The contact surface of the lifter is adapted to establish initial contact with a vertically disposed obstacle, and thereafter the lifter is configured to pivot about the first end such that the wheel is lifted and translated over the vertical obstacle.

In another embodiment, a wheel system includes a frame, a pair of wheels rotatably mounted to the frame, and a lifter disposed at least partially between the pair of wheels. The lifter defines a first end and a second end. The first end of the lifter is pivotably mounted to the frame, and the second end of the lifter defines a contact surface. The wheel system also includes a spring configured to bias the lifter into a fully retracted position in which the pair of wheels can operate with minimal interference. The contact surface of the lifter is adapted to establish initial contact with a vertically disposed obstacle. Thereafter the lifter is configured to pivot about the first end and away from the fully retracted position such that the pair of wheels are lifted and translated over the vertical obstacle in a manner that minimizes the effort required to traverse the vertical obstacle.

Various other features, objects, and advantages of the invention will be made apparent to those skilled in the art from the accompanying drawings and detailed description thereof.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of the invention.

Figure 1:
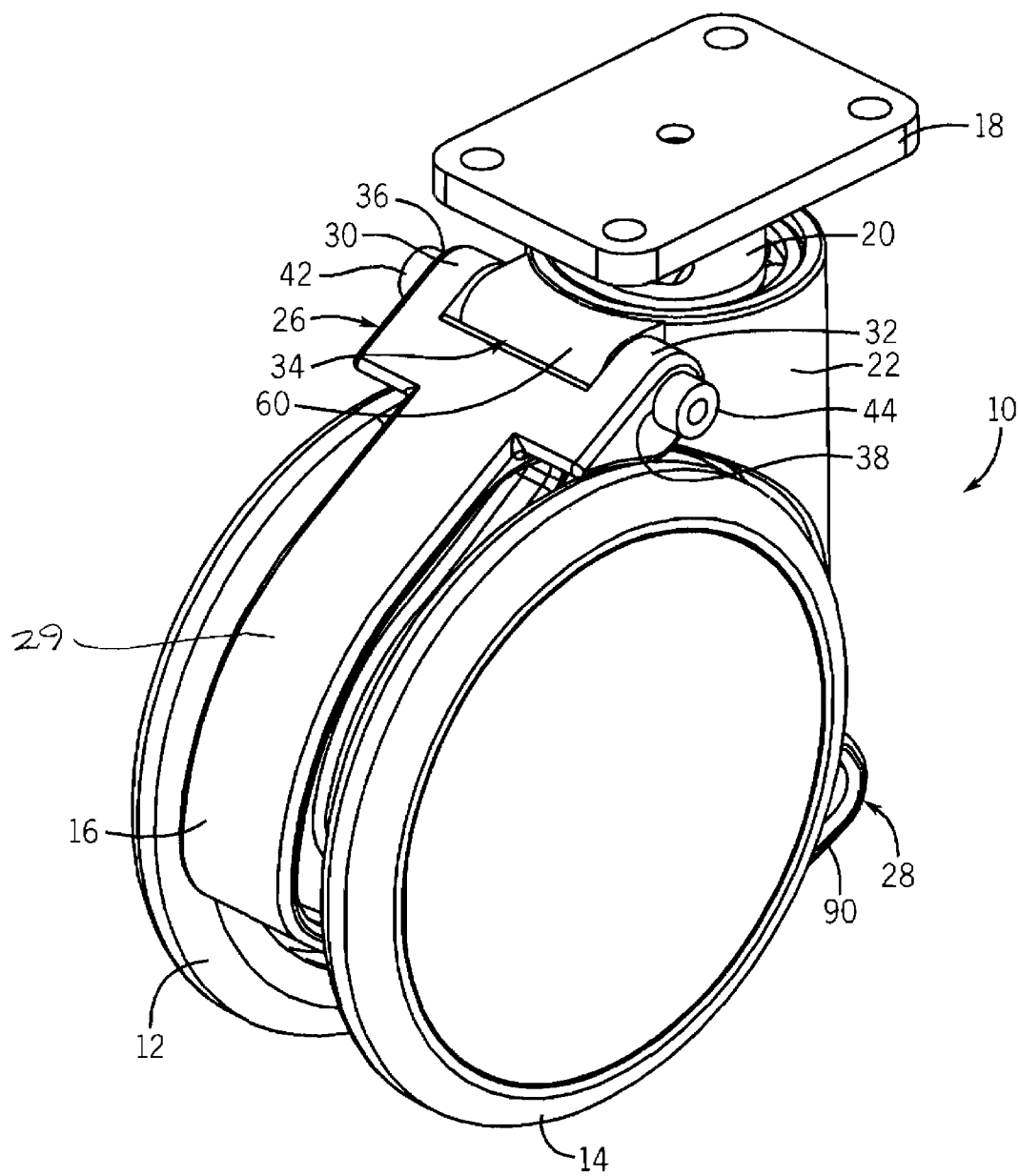
FIG. 1 is an isometric view of a wheel system in accordance with an embodiment.

Referring to FIG. 1, a wheel system 10 is shown in accordance with an embodiment. The wheel system 10 is adapted to facilitate the translation of an object or device such as, for example, a wheel chair, a hand truck, a utility cart, a portable medical device, etc. For illustrative purposes, the wheel system 10 will be described in accordance with an embodiment in which it is adapted for attachment to a portable medical device such as an anesthesia machine, a patient monitoring device, an imaging device, etc. in order to facilitate the movement of the medical device within a hospital environment. As will be described in detail, the wheel system 10 allows the attached medical device to be rolled along generally flat surfaces (e.g., a hallway), and to be lifted and subsequently transported over obstacles such as a vertical threshold or step. The wheel system 10 is depicted and will hereinafter be described as a caster wheel system comprising a lifter at least partially disposed between two individual wheels. It should, however, be appreciated that the wheel system 10 may comprise alternate systems (e.g., single wheel systems) and configurations, and that the wheel system 10 may be implemented for use with a wide variety of devices including but not limited to portable medical devices.

The wheel system 10 includes a first wheel 12 and a second wheel 14. The wheel system 10 also includes a lifter 16 disposed at least partially between the first and second wheels 12, 14 as measured in an axial direction. The wheel system 10 also includes a mounting plate 18, a swivel post 20, a frame 22, and a spring member or helical spring 24 (shown in FIG. 2).

Figure 2:
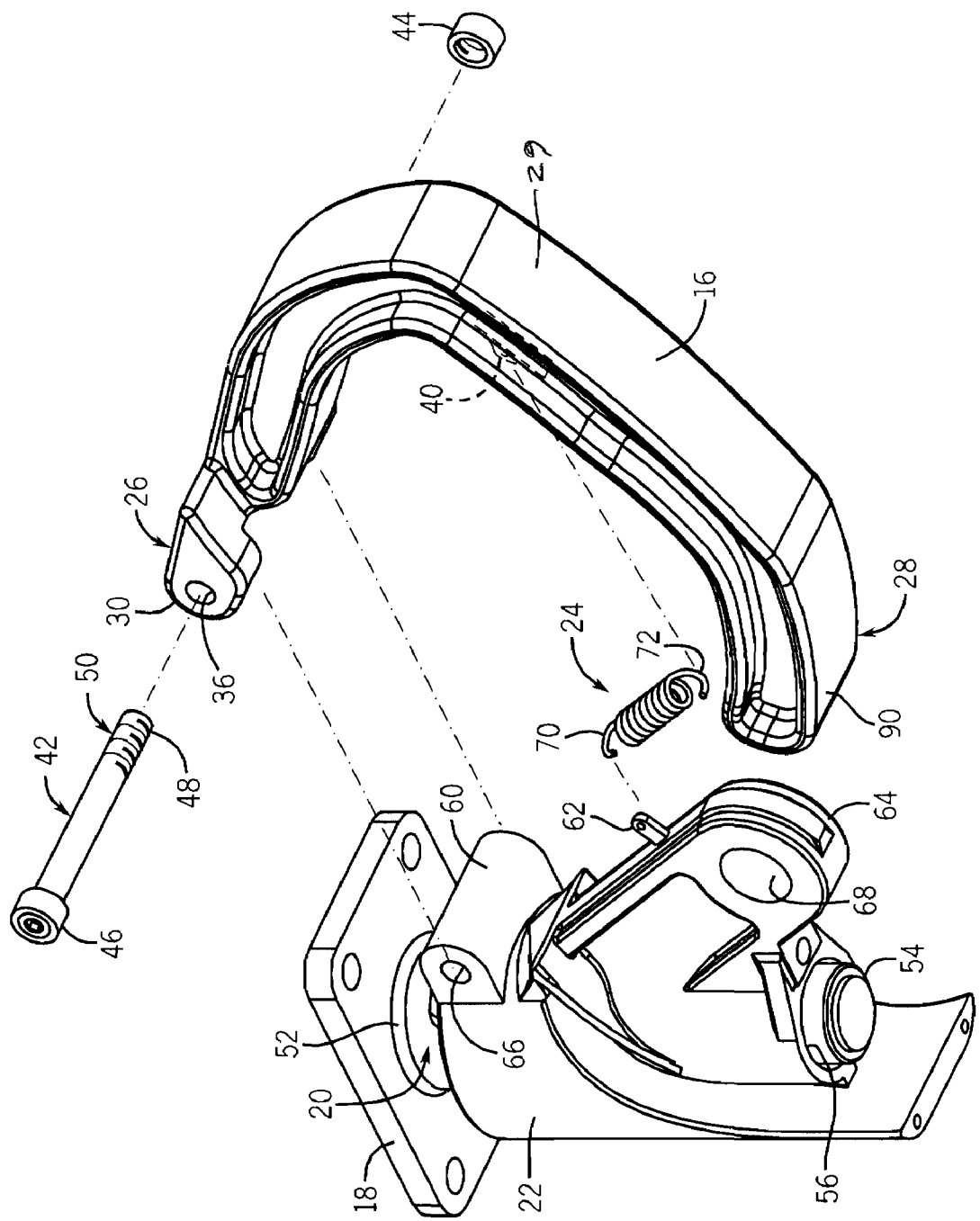
FIG. 2 is an isometric partially exploded view of some of the components of the wheel system of FIG. 1 in accordance with an embodiment.

The lifter 16 may comprise a generally C-shaped elongated member defining a first terminal end 26 and a second terminal end 28 interconnected by a curved intermediate body 29. The first end 26 of the lifter 16 includes a pair of spaced apart lifter arms 30, 32 defining a lifter notch 34 therebetween. The arms 30, 32 respectively define apertures 36, 38 that are in alignment with each other. The second end 28 of the lifter 16 defines a contact surface and leading portion in close proximity to a periphery of each wheel 12, 14, and engageable with an obstacle 90. The lifter 16 also comprises a spring tab 40 (shown in FIG. 2), an axle 42, and an axle nut 44. As best seen in FIG. 2, the axle 42 defines a first end 46 having an increased diameter head portion, a generally opposite second end 48, and a threaded section 50 extending from the second end 46.

Referring to FIG. 2, an exploded isometric view shows some of the wheel system 10 components in accordance with an embodiment. The mounting plate 18 facilitates the attachment of the wheel system 10 to a device (e.g., a portable medical device). The swivel post 20 is generally cylindrical. The swivel post 20 defines a first terminal end 52 rigidly secured to the mounting plate 18, and a generally opposite second terminal end 54.

The frame 22 defines a generally cylindrical frame aperture 56 adapted to accommodate the swivel post 20. The frame 22 is mounted to the swivel post 20 such that the second end 54 of the swivel post 20 is inserted into and passes through the frame aperture 56. Mounting the frame 22 in the manner described allows the frame 22 to swivel or rotate relative to the swivel post 20. The frame 22 comprises a frame protrusion 60, a spring post 62, and arm 64. The frame protrusion 60 and the arm 64 respectively define axle apertures 66 and 68.

According to one embodiment, the first terminal end 26 of the lifter 16 is mounted to the frame protrusion 60 such that the lifter 16 is rotatable relative to the frame 22. Alternatively, the lifter 16 may be rotatably mounted to a device (e.g., a portable medical device) having a conventional wheel system. The aforementioned rotatable connection will hereinafter be described in accordance with the depicted embodiment, however it should be appreciated that alternate rotatable connections may be envisioned. The lifter arms 30, 32 (shown in FIG. 1) are initially aligned with and respectively engage opposite ends of the frame protrusion 60 such that the frame protrusion 60 is disposed within the lifter notch 34. The second end 48 of the axle 42 is then inserted into and passed through the aperture 36, the aperture 66, and the aperture 38. The axle nut 44 is then secured to the threaded section 50 of the axle 42. In this manner, the lifter 16 is rotatable about the axle 42 relative to the frame 22.

The helical spring 24 defines a first end 70 and a generally opposite second end 72. The first end 70 is secured to the spring post 62 of the frame 22, and the second end 72 is secured to the spring tab 40 of the lifter 16. When attached in the manner described, the helical spring 24 is configured to apply a force pulling the spring post 62 toward the spring tab 40 and to thereby bias the lifter 16 into its fully retracted position in which the lifter 16 is pivoted or rotated in a clockwise direction to the maximum degree allowable.

Figure 3:
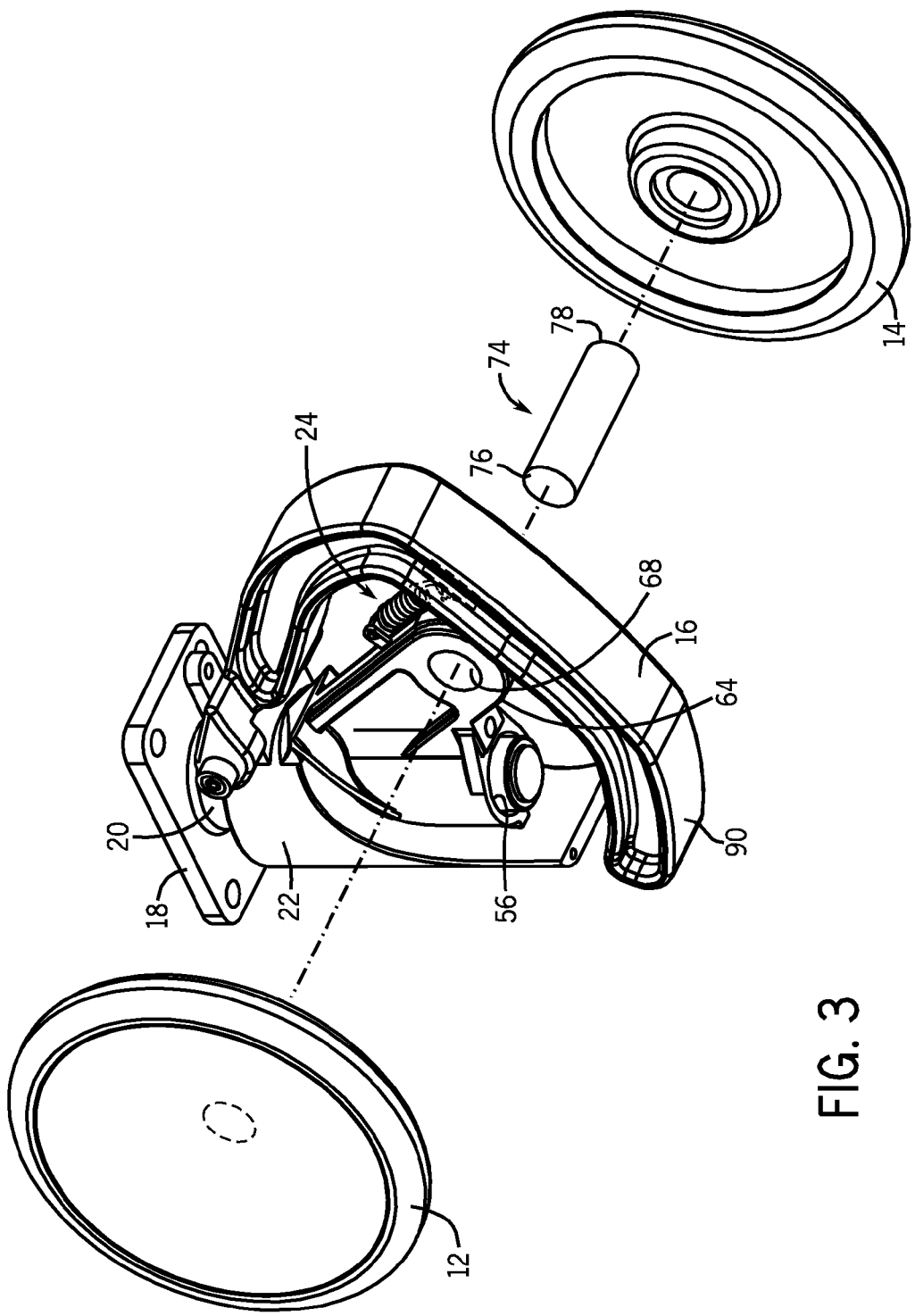
FIG. 3 is an isometric partially exploded view of the wheel system of FIG. 1 in accordance with an embodiment.

Referring to FIG. 3, an exploded isometric view shows the wheel system 10 in accordance with an embodiment. More precisely, lifter 16, the mounting plate 18, the swivel post 20, the frame 22, and the helical spring 24 are shown mounted together and in their assembled state. The wheels 12, 14 and the axle 74 are exploded from the remainder of the wheel system 10 components.

The axle 74 defines a first end 76 and a second generally opposite end 78. The axle 74 is passed through the axle aperture 68 of the arm 64. The first wheel 12 is then secured to the first end 76 of the axle 74 and the second wheel 14 is secured to the second end 78 of the axle 74. Configuring the wheel system 10 in the manner previously described allows the wheels 12, 14 to rotate about the axle 74 relative to the frame 22 in order to facilitate the transportation of an attached device (e.g., a portable medical device) in a generally straight line. Rotation of the frame 22 relative to the swivel post 20 in the manner previously described allows a user to more easily change direction while transporting an attached device (e.g., a portable medical device).

The lifter 16 is depicted in FIG. 3 as being biased into its fully retracted position by the helical spring 24. It should be appreciated that, in its fully retracted position, the lifter 16 is rotated into a position allowing the wheels 12, 14 to operate freely on a flat surface without interference. Also, it should be appreciated that in the retracted position, the intermediate body 29 lies substantially completely within the periphery of each wheel 12, 14. As will be described in detail hereinafter, the lifter 16 can be rotated out of its fully retracted position to help transport an attached device (e.g., a portable medical device) over a step or threshold.

Figure 4:
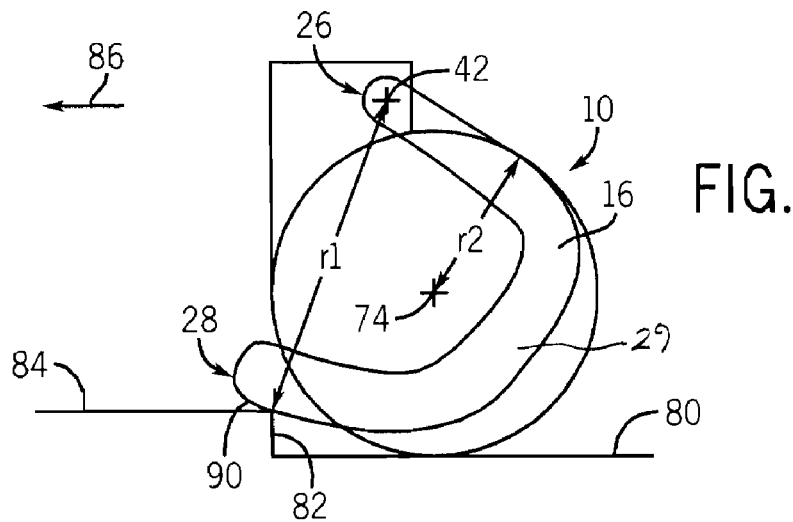
FIG. 4 is a schematic side view of the wheel system of FIG. 1 in accordance with an embodiment.
Figure 5:
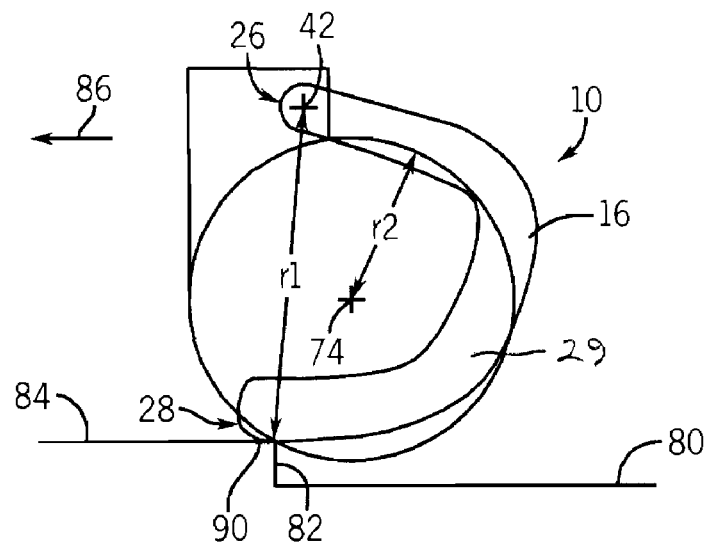
FIG. 5 is a schematic side view of the wheel system of FIG. 1 in accordance with an embodiment.
Figure 6:
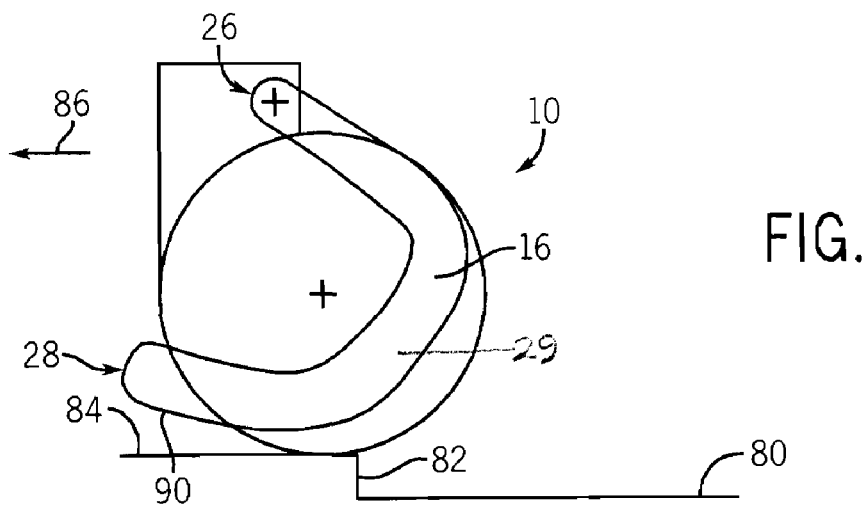
FIG. 6 is a schematic side view of the wheel system of FIG. 1 in accordance with an embodiment.

Having described the components of the wheel system 10, its operation will now be described in detail. Referring to FIGS. 4-6, the wheel system 10 is sequentially depicted as traveling along a first flat surface 80 in the direction indicated by arrow 86, passing over a step 82, and then traveling along a second flat surface 84 in the direction indicated by arrow 86.

In FIG. 4, the wheel assembly 10 is depicted as traveling along the flat surface 80 just as the wheel assembly 10 makes contact with the step 82. It can be seen that the step 82 is first engaged by the contact surface 90 of the lifter 16. The contact surface 90 is depicted in accordance with an embodiment as having an arcuate or radial contour, however other configurations may be envisioned. The contact surface 90 may be defined at a bottom portion of the lifter 16 at or near the second terminal end 28.

Referring to FIG. 5, after the contact surface 90 of the lifter 16 engages the step 82, the momentum of the wheel system 10 (and that of any attached device) acts to rotate or pivot the lifter 16 in a counter-clockwise direction about axle 42 relative to the frame 22. This counter-clockwise rotation of the lifter 16 raises and generally simultaneously translates the wheels 12-14 in the direction of the arrow 86. By raising and translating the wheels 12-14 in the manner described, the wheels 12-14 can pass over the step 82 with less effort than would be required with conventional wheel systems. When passing over the step 82, the lifter 16 functions like a wheel having a radius r1 that greatly exceeds that of the radius r2 of the wheels 12, 14. It is well known to those skilled in the art that larger radius wheel systems can more easily pass over steps or other vertically disposed obstacles. The lifter 16 allows the wheel system 10 to enjoy the benefits of larger wheels when passing over vertically disposed surfaces, while retaining the advantages of smaller wheels in other conditions.

Referring to FIG. 6, after the wheels 12, 14 have passed over the step 82 the return spring 24 (shown in FIG. 3) returns the lifter 16 to its fully retracted position. When the lifter 16 is retracted, the wheels 12, 14 can operate freely on the flat surface 84 without interference.

The operation of the lifter 16 in the manner previously described reduces the force required to push the wheel system 10 (and any attached device) over a step or threshold and thereby conveniences users having to push heavy devices over such obstacles. This reduction in force should be readily apparent to someone skilled in the art based on basic principles of physics, and has also been supported through testing. A prototype wheel system was attached to a 155 lb device and pushed over a 20 mm vertical step both with and without a lifter mechanism (similar to the lifter 16). A load gauge was implemented to measure the force required to pull the device over the step. The test revealed that a force of 114 lb was required to pull the device over the step without the lifter mechanism, and that a force of 46 lb was required to pull the device over the step with the lifter mechanism.

The operation of the lifter 16 also reduces the likelihood that the wheel system 10 and any attached device will tip over as it passes over a step or threshold. As previously stated, the lifter behaves as a much larger wheel system when passing over steps. It is well known that smaller wheels are more likely to become impeded or stopped by a step such that any additional applied force (particularly when applied near the top of an attached device) can cause the device to tip over.

Figure 7:
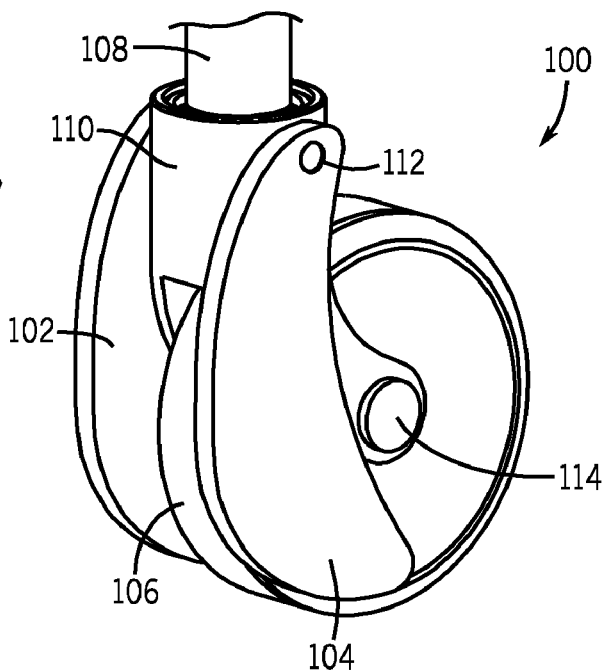
FIG. 7 is a schematic isometric view of a wheel system in accordance with an embodiment.

Referring to FIG. 7, a wheel system 100 is shown in accordance with an embodiment. The wheel system 100 is adapted to facilitate the translation of an object or device in a manner similar to that previously described with reference to the wheel system 10. The wheel system 100 includes a first lifter 102 and a second lifter 104. The wheel system 100 also includes a single wheel 106 disposed at least partially between the first and second lifters 102, 104 as measured in an axial direction. The wheel system 100 also includes a swivel post 108, and a frame 110. The lifters 102, 104 are pivotably mounted to the frame 110 via a lifter axle 112, and the wheel 106 is pivotably mounted to the frame 110 via a wheel axle 114. The lifters 102, 104 are configured to engage a vertically disposed obstacle, and to thereafter pivot about the axle 112 such that the wheel 106 is lifted and translated over the obstacle in a manner similar to that previously described with respect to the wheel system 10.

Figure 8:
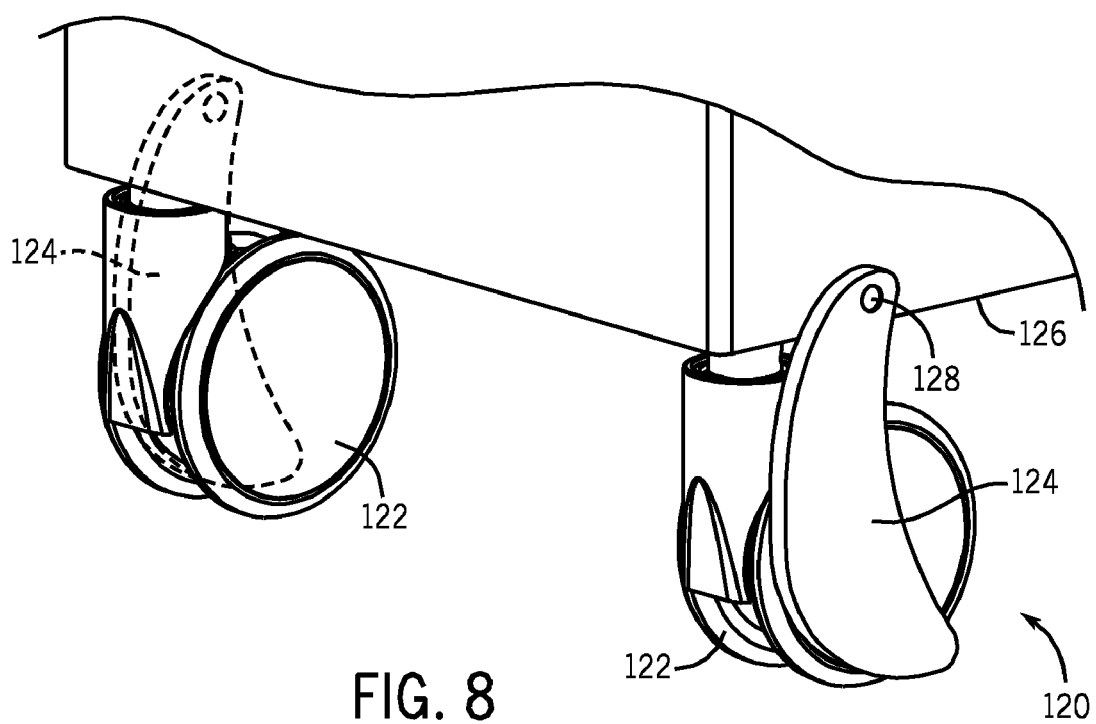
FIG. 8 is a schematic isometric view of a system in accordance with an embodiment.

Referring to FIG. 8, a system 120 is shown in accordance with an embodiment. The system 120 comprises one or more wheel systems 122, and one or more lifters 124. The wheel systems 122 are attached to and adapted to facilitate the translation of a device 126. The device 126 may comprise a portable medical device, however other devices may be envisioned. The lifters 124 are pivotably mounted to the device 126 via a lifter axle 128. The lifters 124 are configured to engage a vertically disposed obstacle, and to thereafter pivot about the axle 128 such that the wheel systems 122 are lifted and translated over the obstacle in a manner similar to that previously described with respect to the wheel system 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A wheel system comprising:
a frame;
a wheel rotatably mounted to the frame about a first axle defining a first horizontal axis and adapted to rollably engage a support surface;
a lifter movable into and out of a retracted position and adapted to lift the wheel over a vertically disposed obstacle along the support surface, the lifter being defined by a generally C-shaped elongated member disengaged from the first axle and having first and second terminal ends facing opposite each other and interconnected by a curved intermediate body lying substantially completely within a periphery of the wheel when the lifter is in the retracted position, the first terminal end being pivotably and separately mounted to the frame about a second axle spaced from the first axle and defining a second horizontal axis, the second axle being located outside the periphery of the wheel, the second free-terminal end defining a contact surface and leading portion that is non-rotatable relative to the intermediate body and engageable with the obstacle for enabling lifting of the wheel; and
a spring member separately located between a lower portion of the frame and a midportion of the curved intermediate body between the first and second terminal ends,
wherein the contact surface and leading portion of the lifter is adapted to establish initial contact with the obstacle, and thereafter the lifter is configured to pivot about the first terminal end such that the wheel is lifted and translated over the obstacle; and
wherein the spring member comprises a helical spring configured to bias the lifter into a fully retracted position in which the wheel can operate with minimal interference.

2. The wheel system of claim 1, wherein the frame defines a frame aperture adapted to accommodate a swivel post.

3. The wheel system of claim 1, further comprising a mounting plate rigidly mounted to the swivel post.

4. The wheel system of claim 1, wherein the wheel comprises a pair of wheels, and wherein the lifter is disposed at least partially between the pair of wheels as measured in an axial direction.

5. The wheel system of claim 1, wherein the frame comprises a spring post adapted to receive a first end of the spring, and wherein the lifter comprises a spring tab adapted to receive a second end of the spring.

6. The wheel system of claim 1, wherein the contact surface of the lifter defines a radial contour.

7. A wheel system comprising:
a frame;
a pair of wheels rotatably mounted to the frame about a first axle defining a first horizontal axis and adapted to rollably engage a support surface;
a lifter disposed at least partially between the pair of wheels, the lifter being movable into and out of a retracted position and adapted to lift the wheels over a vertically disposed obstacle along the support surface, the lifter being defined by a generally C-shaped elongated member disengaged from the first axle and having first and second terminal ends facing opposite each other and interconnected by a curved intermediate body lying substantially completely within a periphery of each of the wheels when the lifter is in the retracted position, the first terminal end being pivotably mounted to the frame about a second axle spaced from the first axle and defining a second horizontal axis, the second axle being located outside the periphery of each wheel, the second terminal end defining a contact surface and leading portion engageable with the obstacle for enabling lifting of the wheels; and
a spring configured to bias the lifter into a fully retracted position in which the pair of wheels can operate with minimal interference, the spring being separately located between a lower portion of the frame and a midportion of the curved intermediate body between the first and second terminal ends;
wherein the contact surface and leading portion of the lifter is adapted to establish initial contact with the vertically disposed obstacle, and thereafter the lifter is configured to pivot about the first terminal end and out of the retracted position such that the pair of wheels are lifted and translated over the vertical obstacle in a manner that minimizes the effort required to traverse the vertical obstacle.

8. The wheel system of claim 7, wherein the frame defines a frame aperture adapted to accommodate a swivel post.

9. The wheel system of claim 7, further comprising a mounting plate rigidly mounted to the swivel post.

10. The wheel system of claim 1, wherein the frame comprises a spring post adapted to receive a first end of the spring, and wherein the lifter comprises a spring tab adapted to receive a second end of the spring.

11. The wheel system of claim 1, wherein the contact surface of the lifter defines a radial contour.

* * * * *

UNITED STATES PATENT AND TRADEMARK OFFICE
CERTIFICATE OF CORRECTION

| | | |
|---|---|---|
| PATENT NO. | : 8,214,970 B2 | Page 1 of 1 |
| APPLICATION NO. | : 12/638734 | |
| DATED | : July 10, 2012 | |
| INVENTOR(S) | : Sullivan | |

It is certified that error appears in the above-identified patent and that said Letters Patent is hereby corrected as shown below:

In Column 6, Line 4, in Claim 1, delete "free-terminal" and insert -- terminal --, therefor.

Signed and Sealed this
Twenty-second Day of January, 2013

David J. Kappos
*Director of the United States Patent and Trademark Office*